United States Patent [19]

Parkhurst

[11] Patent Number: 4,852,708
[45] Date of Patent: Aug. 1, 1989

[54] SPRING SHIELD FOR STARTER DRIVES FOR INTERNAL COMBUSTION ENGINES

[76] Inventor: Charles Parkhurst, 1282 Pitt River Road, Port Coquitlam, British Columbia, Canada, V3C 1N7

[21] Appl. No.: 173,180

[22] Filed: Mar. 24, 1988

[51] Int. Cl.⁴ ............................................. F16D 23/00
[52] U.S. Cl. .......................................... 192/45; 74/6; 74/7 C; 188/82.84
[58] Field of Search .................... 74/6, 7 R, 7 A, 7 E, 74/7 C; 192/42, 44, 45; 188/82.84

[56] References Cited

U.S. PATENT DOCUMENTS

| | | | |
|---|---|---|---|
| 367,883 | 8/1887 | Yost et al. | 192/45 |
| 2,069,558 | 2/1937 | Rauen et al. | 192/45 |
| 2,372,734 | 4/1945 | Orr | 188/82.84 |
| 2,684,139 | 7/1954 | Lewis | 192/45 |
| 2,835,364 | 5/1958 | Picard | 192/45 |
| 3,087,591 | 4/1963 | Whitney et al. | 192/45 |
| 3,750,782 | 8/1973 | Costantini et al. | 192/42 |
| 3,820,406 | 6/1974 | Toulier | 74/6 |
| 4,415,072 | 11/1983 | Shoji et al. | 192/45 |

FOREIGN PATENT DOCUMENTS

| | | | |
|---|---|---|---|
| 43973 | 7/1908 | Switzerland | 192/45 |
| 324025 | 8/1957 | Switzerland | 188/82.84 |

Primary Examiner—Leslie A. Braun
Assistant Examiner—Scott Anchell
Attorney, Agent, or Firm—Barrigar & Oyen

[57] ABSTRACT

A small metal shield is disclosed which lengthens the life of the rectangular springs in starter drives for internal combustion engines. The shield has a rectangular face which slightly overlaps the edges of the spring and a projection which seats the shield in the spring between the end of the spring and the cylindrical roller. The projection may be perpendicular to the face or at a slight angle from the perpendicular.

4 Claims, 2 Drawing Sheets

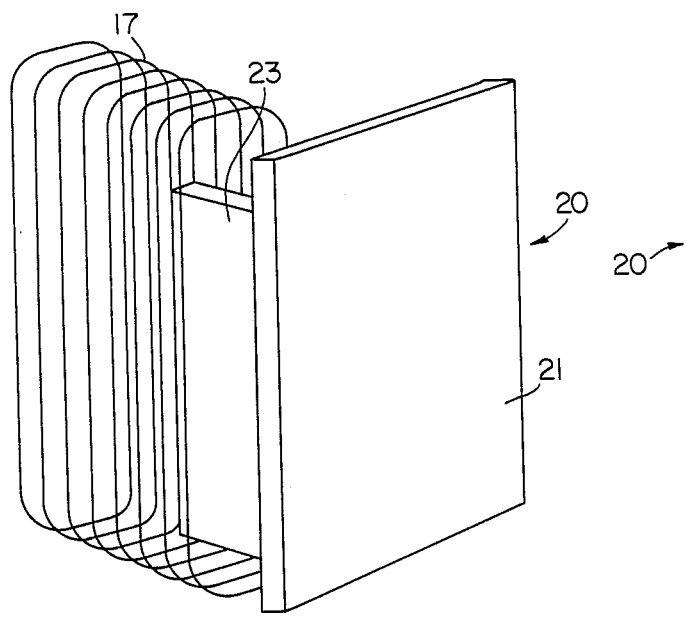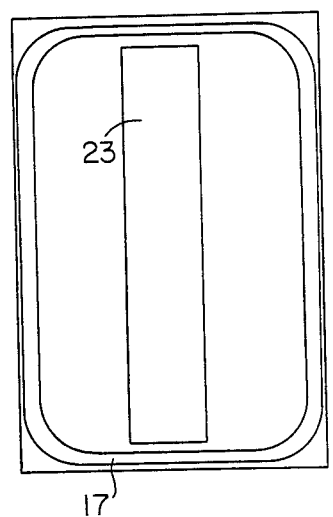

4,852,708

SPRING SHIELD FOR STARTER DRIVES FOR INTERNAL COMBUSTION ENGINES

BACKGROUND OF THE INVENTION

The invention relates to starter drives for internal combustion engines, and more particularly to a shield for the rectangular springs in such starter drives.

Standard internal combustion engines generally utilize an electric starting motor with a starter drive having a roller overrunning clutch structure of the type referred to in U.S. Pat. No. 3,830,406 issued June 28, 1974 to Toulier. Such a starter drive has a pinion gear for mating with the flywheel of the engine to be started. The starter drive has a sleeve which is mounted on the shaft output of the starter motor and which is connected to the driving portion of the clutch. The driven portion of the clutch is connected to the pinion gear. The driving portion of the clutch is annular around and concentric with the driven member. A number of cylindrical rollers are housed in tapered recesses formed in the driving member. Each roller is wedged against the wall of the recess and the outer cylindrical surface of the driven member when the driven member is rotated by the starter motor, and is biased away from the wedging position by a rectangular spring when the pinion gear overruns the driving member. In this way, the starter motor can drive the pinion gear when it is meshed with the flywheel of the engine to be started, but will allow the flywheel to overrun the starter motor when the engine has been started. Rectangular rather than circular springs are required to effectively engage the sides of the cylindrical rollers.

The most common reason for failure of such starter drives is the failure of the rectangular springs. The constant flexing of the springs under pressure eventually causes failure of the springs and seizing of the starter drive which in turn can cause damage to the starter motor and generally requires repair and replacement of the starter drive. In the Toulier U.S. Pat. No. 3,820,406, there is suggested the replacement of the rectangular springs with a pair of circular springs used in conjunction with a guide and a base plate. However, this design cannot be used with the existing springs of standard starter drives, and it requires at least four parts to replace each spring. There is therefore a need for a simple means of improving the performance of the rectangular springs in existing starter drives.

SUMMARY OF THE INVENTION

The present invention provides a shield for the rectangular springs of starter drives. The shield comprises a rectangular face sized to slightly overlap the edges of the rectangular spring, and an extension connected to the face for insertion in the end of the rectangular spring to properly locate the shield. The extension may join the face at right angles or at a slight angle from the perpendicular.

BRIEF DESCRIPTION OF THE DRAWINGS

The drawings which illustrate a preferred embodiment of the invention:

FIG. 3 is a perspective view of the spring shield of the invention; and

FIG. 4 is an end view of the spring shield shown in FIG. 3, with a rectangular spring in place.

DETAILED DESCRIPTION OF A PREFERRED EMBODIMENT OF THE INVENTION

Figure 1:
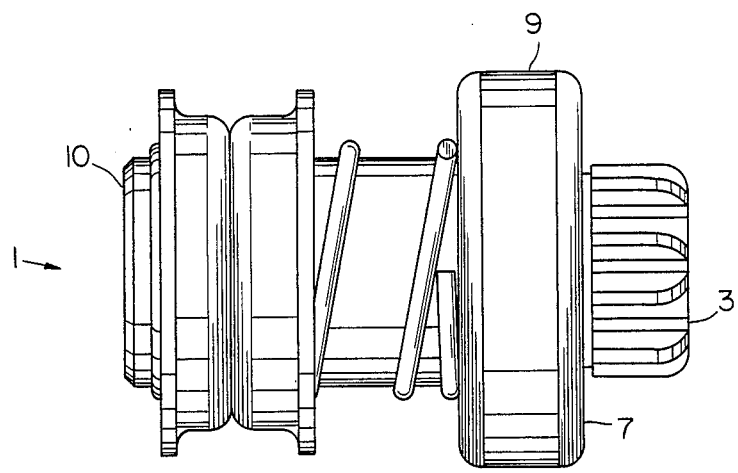
FIG. 1 is an elevational view of a typical starter drive construction.

Referring to FIG. 1, the starter drive is designated generally as 1. A pinion gear 3 is connected to the driven member 5 of the clutch 7. The driving member 9 of the clutch 7 forms an annular collar around the driven member. The driving portion 9 is in turn connected to hollow sleeve 10 which is screw-threaded onto the drive shaft of the starter motor.

Figure 2:
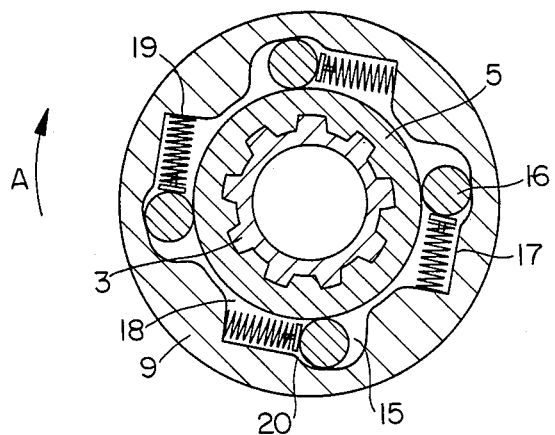
FIG. 2 is a right-end view of the starter drive shown in FIG. 1 and showing the overrunning clutch construction.

Referring to FIG. 2, four tapered recesses 15 are formed in the driving element 9. A cylindrical steel roller 16 is located in each tapered recess. Bearing against each roller 16 is a rectangular spring 17. Springs 17 are located in angled recesses 18, with one end of spring 17 bearing against wall 19 of the recess, and the opposite end bearing against rollers 16.

When driving member 9 is rotated in the direction shown by arrow A, the rollers 16 are wedged between the wall of recesses 15, and the outer cylindrical surface of driven member 5, causing the pinion gear 3 to rotate. When the pinion gear 3 overruns the rotation of driving element 9, the relative motion of the driven member element 5 with respect to the driving member 9 causes the rollers to be forced in a clockwise direction into the wider portion of recesses 15. The springs 17 oppose the movement of the rollers 16 thereby causing a sliding movement between the surface of rollers 16 and the respective surfaces of driving member 9 and driven member 5. The pinion gear 3 is thereby allowed to rotate free from driving element 9.

The spring shield of the invention is designated as 20 in FIGS. 2, 3 and 4. It consists of a rectangular face 21, and an attached perpendicular rectangular extension 23. As shown in FIG. 4, the size of the rectangular face 21 is such that the rectangular face just overlaps the edges of rectangular spring 17. Similarly, the size of rectangular projection 23 is such that it fits within the central opening formed by the spring. The shield may be formed of copper, or some other durable metal or synthetic material. The material should, however, be softer than rollers 16 which are typically of steel. It is important also that projection 23 not be so long that it causes the springs to "bottom out" when flexed to the limit, or in other words that its length is less than the length of the spring when the spring is in its state of maximum operating compression. Generally, the shield will be sized so that there is about ⅛ inch clearance between the end of projection 23 and the wall 19 when the spring is unflexed. Similarly, the rectangular face 21 cannot be wider than the diameter of the rollers. Preferably also, the height of rectangular face 21 is the same as that of the rollers.

In some arrangements, springs 17 will bow inwardly and rub on the cylindrical surface of driven element 5. This causes wearing of the spring. To avoid this problem, the spring shield may be formed so that projection 23 meets face 21 at a slight angle. The shield is then installed so that the face 21 faces slightly inwardly towards the driven element 5, causing the spring to bow outwardly and thereby avoid wear.

In use, the starter drive is disassembled and the spring shields placed in the end of each spring 17. The overrunning clutch is packed with good grease in the usual fashion.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

The embodiments of the invention in which an exclusive property or privilege is claimed are defined as follows:

1. In a starter drive for internal combustion engines said starter drive having an overrunning clutch comprising a driving member concentric with and around a driven, member said driven member having a cylindrical outer surface, a plurality of cylindrical rollers housed within recesses formed in said driving member, each roller being biassed by a rectangular coil spring, the improvement comprising a shield of durable material positioned between the end of said spring and a surface of said roller wherein said shield comprises:

(a) a rectangular face having dimensions greater than or equal to the rectangular cross-sectional shape of said spring, and comprising a durable material no harder than said roller; and (b) a projection connected to said face and received in a central opening of one end of said spring and having a length less than the length of said spring when said spring is in its state of maximum operating compression.

2. The improvement of claim 1 wherein said shield is made of copper.

3. The improvement of claim 1 wherein said projection connects to said face at right angles.

4. The improvement of claim 1 wherein said projection connects to said face at an angle slightly beyond the perpendicular.

* * * * *